US008567682B2

(12) United States Patent
Boyd

(10) Patent No.: US 8,567,682 B2
(45) Date of Patent: Oct. 29, 2013

(54) PORTABLE TERMINAL AND PISTOL GRIP SLED WITH OPTIMIZED SCAN ANGLE

(75) Inventor: Barry Boyd, Oakville (CA)

(73) Assignee: Psion, Inc., Mississauga, Ontario (CA)

( * ) Notice: Subject to any disclaimer, the term of this patent is extended or adjusted under 35 U.S.C. 154(b) by 397 days.

(21) Appl. No.: 12/511,374

(22) Filed: Jul. 29, 2009

(65) Prior Publication Data

US 2010/0025473 A1   Feb. 4, 2010

(30) Foreign Application Priority Data

Jul. 29, 2008   (CA) ..................................... 2638361
Jul. 28, 2009   (CA) ..................................... 2673217

(51) Int. Cl.
*G06K 7/10*   (2006.01)
(52) U.S. Cl.
USPC ..................................... 235/472.01; 235/486
(58) Field of Classification Search
USPC ..................................... 235/472.01, 482, 486
See application file for complete search history.

(56) References Cited

U.S. PATENT DOCUMENTS

| 5,349,497 | A | * | 9/1994 | Hanson et al. | ........... | 235/472.01 |
|---|---|---|---|---|---|---|
| 5,410,141 | A | | 4/1995 | Koenck et al. | | |
| 5,414,251 | A | * | 5/1995 | Durbin | ....................... | 235/462.2 |
| 5,500,516 | A | * | 3/1996 | Durbin | ..................... | 235/472.01 |
| 5,736,726 | A | * | 4/1998 | VanHorn et al. | ......... | 235/472.02 |
| 5,763,867 | A | * | 6/1998 | Main et al. | ................ | 235/462.46 |
| 5,962,837 | A | * | 10/1999 | Main et al. | ................ | 235/462.44 |
| 6,003,773 | A | * | 12/1999 | Durbin et al. | ............. | 235/462.45 |
| 6,109,528 | A | * | 8/2000 | Kunert et al. | ............. | 235/472.01 |
| 6,837,435 | B2 | * | 1/2005 | Kehoe et al. | .............. | 235/472.01 |
| D571,808 | S | * | 6/2008 | Dorr et al. | .................... | D14/429 |

OTHER PUBLICATIONS

Non Final Office Action mailed Jul. 19, 2012 in counterpart U.S. Appl. No. 13/481,052, Barry Boyd filed May 25, 2012.
Final Office Action mailed Dec. 10, 2012 in counterpart U.S. Appl. No. 13/481,052, Barry Boyd filed May 25, 2012.

(Continued)

*Primary Examiner* — Christle Marshall
(74) *Attorney, Agent, or Firm* — Randi L. Karpinia; Michael J. Giannetta

(57) ABSTRACT

A portable terminal, handheld computer and handle are provided. The portable terminal includes a handheld computer operable as a stand-alone device, including operational components having a display and a scanner, and an expansion connector capable of detachably coupling to a peripheral. The peripheral includes at least a handle held by an operator of the portable terminal. The handheld computer is electrically and mechanically coupled to the handle so that the angle between the viewing area of the display and a scanner beam from the scanner is optimized without tilting the viewing area of the display. The portable terminal includes: a handheld device operable as a stand-alone device, including: one or more operational components; and an expansion connector being capable of detachably coupling to a peripheral directly or via an external device connectable to the peripheral, the handheld device being electrically coupled to the peripheral via the expansion connector and identifies the peripheral. The handle for a handheld device, includes: a housing including a grip held by an operator of a handheld device, the handheld device being operable as a stand alone device; a coupling assembly being capable of mechanically and operationally coupling to the handheld device directly or via an external device connectable to the handheld device; and an actuator coupling to the coupling assembly for actuating at least one function of the handheld device, the actuator being configured so that the user operates the actuator while holding the grip.

7 Claims, 13 Drawing Sheets

(56) References Cited

OTHER PUBLICATIONS

Office Action for counterpart Canadian Application No. 2673217 mailed on Jan. 7, 2010.
Office Action for counterpart Canadian Application No. 2673217 mailed on Jul. 5, 2010.
Office Action for counterpart Canadian Application No. 2673217 mailed on Feb. 1, 2011.
Office Action for counterpart Canadian Application No. 2673217 mailed on May 17, 2012.
Office Action for counterpart Canadian Application No. 2673217 mailed on Jan. 3, 2013.
Official Communication received in corresponding Canadian Patent Application No. 2,673,217 dated Jan. 16, 2012.

* cited by examiner

PORTABLE TERMINAL AND PISTOL GRIP SLED WITH OPTIMIZED SCAN ANGLE

CROSS-REFERENCE TO RELATED APPLICATIONS

This application claims priority to Canadian Patent Application Serial No. 2,638,361 filed Jul. 29, 2008 and to Canadian Patent Application Serial No. 2,673,217 filed Jul. 28, 2009.

STATEMENT REGARDING FEDERALLY SPONSORED RESEARCH OR DEVELOPMENT

None.

NAMES OF THE PARTIES TO A JOINT RESEARCH AGREEMENT

None.

REFERENCE TO A "SEQUENCE LISTING"

None.

BACKGROUND OF THE INVENTION

Handheld data capture devices (e.g., Radio frequency identification (RFID) readers, scanners, imagers) are used in a variety of applications (e.g., tracking items, inventory management). For example, an RFID reader collects information on an item by reading an RFID tag attached on the item, and an imager captures the image of the item itself and/or analyzes the data stored in a barcode.

A handheld data capture device has a display by which an operator of the handheld data capture device knows that the capture operation (e.g., scan) has been registered successfully. The operator manually holds the handheld data capture device close to the item or a marker attached to the item, when capturing desired data. The operator then tilts the handheld data capture device to see the display and confirm whether or not a scan has been registered. Thus, the operator needs to constantly adjust the handheld data capture device in order for capturing data and visual confirmation on whether the data capture is done.

In addition, the conventional handheld data capture devices have limited capabilities with respect to data capturing.

Therefore, there is a need to provide a handheld device that can be easily operated. There is a need to provide a handheld device that can easily expand its functionalities without compromising the sealing integrity of the device or causing unnecessary loss-of-use due to the complexity of the typical upgrade process (i.e., return to authorized Service Depots for upgrade).

FIELD OF THE INVENTION

The present invention relates to portable terminals, and more specifically to a portable terminal with a data capture component for use with a detachably connectable peripheral (e.g. handle).

BRIEF SUMMARY OF THE INVENTION

It is an object of the invention to provide a method and system that obviates or mitigates at least one of the disadvantages of existing systems.

According to an embodiment of the present invention there is provided a portable terminal, which includes: a handheld computer operable as a stand-alone device, including: operational components having a display and a scanner operably coupling to a processor; and an expansion connector operably coupling to the processor and being capable of detachably coupling to a peripheral. The peripheral includes at least a handle held by an operator of the portable terminal. The handheld computer is electrically coupled to the peripheral. The handheld computer is mechanically coupled to the handle so that the angle between the viewing area of the display and a scanner beam from the scanner is optimized without tilting the viewing area of the display.

According to an embodiment of the present invention there is provided a portable terminal, which includes: a handheld device operable as a stand-alone device, including: one or more operational components; and an expansion connector being capable of detachably coupling to a peripheral directly or via an external device connectable to the peripheral, the handheld device being electrically coupled to the peripheral via the expansion connector and identifies the peripheral.

According to an embodiment of the present invention there is provided a handle for a handheld device, which includes: a housing including a grip held by an operator of a handheld device, the handheld device being operable as a stand alone device; a coupling assembly being capable of mechanically and operationally coupling to the handheld device directly or via an external device connectable to the handheld device; and an actuator coupling to the coupling assembly for actuating at least one function of the handheld device, the actuator being configured so that the user operates the actuator while holding the grip.

BRIEF DESCRIPTION OF THE SEVERAL VIEWS OF THE DRAWING

These and other features of the invention will become more apparent from the following description in which reference is made to the appended drawings wherein.

DETAILED DESCRIPTION OF THE INVENTION

Figure 1:
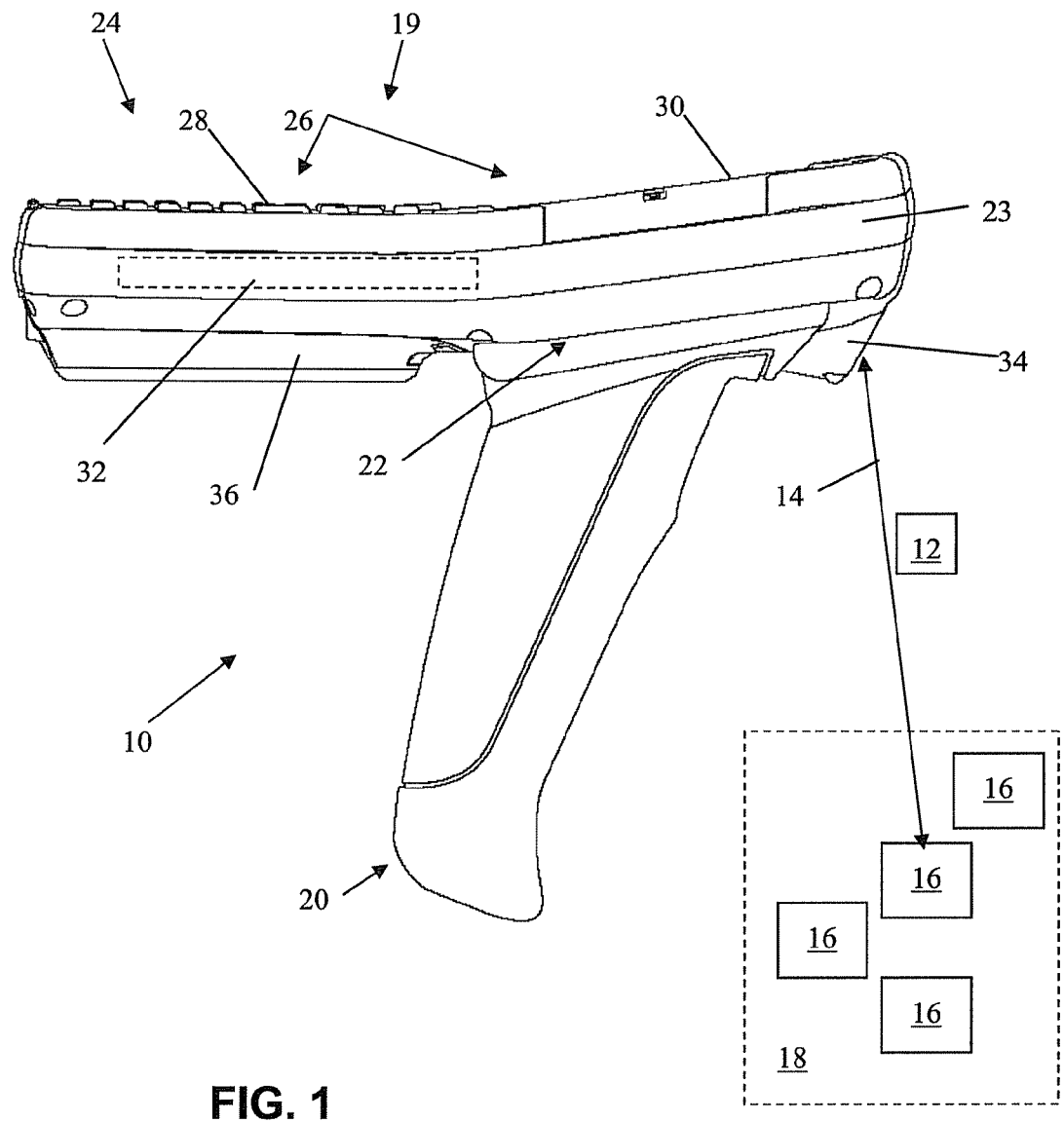
FIG. 1 is a side view of an example of a portable terminal with a pistol grip, in accordance with an embodiment of the present invention.

Embodiments of the present invention are described using a portable terminal having data capture components. The portable terminal has a handheld computer that is capable of detachably coupling to one or more peripherals (e.g., handle). The portable terminal with the handle allows for optimized target viewing for a user, and thus allows for simultaneous scan/data-collection and visual confirmation of the scan/data-collection result. This reduces user fatigue and forestalls potential employee loss work time due to claims of carpal tunnel syndrome (CTS), and improves productivity. The portable terminal also allows for expansion of additional functions/features without adding them into the data capture devices. The expansion may include, but not limited to, data collection/target identification modules for reading/scanning information (e.g., identifier) on a target, including RFID readers/writers, scanners, and imagers, GPS modules, Wireless Wide Area Network (WWAN) Radios. In the description below, the terms "portable terminal" and "handheld terminal" may be used interchangeably.

Portable Terminal (10)

Referring to FIGS. 1-11, one example of a portable terminal 10 in accordance with an embodiment of the present invention is described in detail. The portable terminal 10 has functionality for providing imaging and/or scanning features in data capture/communications 12 and asset tracking/management, for example in wireless communication 14 with tracking objects 16 (e.g. barcode labels and/or RFID tags) present in one or more logistics environments 18 (e.g. industrial, retail, supply chain). The tracking objects 16 can be attached to products that are being transported from one location to another in the logistics environment 18. Examples of these environments 18 can include such as but not limited to: front store retail and/or warehousing for mobile stock checking, price checking, and merchandising; and utilities for meter reading, surveying, parking enforcement, and asset tracking.

The portable terminal 10 can have an optional handle 20, connected via a release securable connection 22, to an enclosure 23 of a handheld computer 24. The handle 20 is attached to the enclosure 23 by fastening means such as but not limited to: protrusions engaged in slots, latch mechanisms, fasteners (e.g. screws), adhesives or other bonding agents, etc.

The computer 24 has a number of components 19 including, for example, a user interface 26, including a keyboard 28 and a display 30 (e.g. touch screen), a processor module having a main logic board and one or more onboard processors 32 (e.g. inside of the enclosure 23), and a scanner/radio communications module 34 (e.g. laser, WLAN with VoIP and Bluetooth, imager, etc.—inside of the enclosure 23) for facilitating the wireless communication 14. The main logic board may support on-board peripheral functions and have expansion slots. The user interface 26 and the scanner/radio communications module 34 are operably coupled to the processor. In one example, the scan operation/instructions/commands may be displayed on the display 30 via the processor(s); the scan results are displayed on the display 30 via the processor(s) 32; inputs from the screen 30 and/or keyboard 28 may trigger some scanning operations; inputs from the keyboard 28 may be displayed on the screen 30. The portable terminal 10 also has an onboard power source 36 for helping to satisfy power requirements of the onboard processor(s) 32, the user interface 26, and optionally the communication module 34.

A keyboard bezel is used to hold the keyboard, and a display bezel is used to hold the display. The keyboard bezel and the display bezel are secured on the cover of the handheld computer 24, by, for example, screws, and can be easily removed.

One of ordinary skill in the art would appreciate that the portable terminal 10 may include components/electrics/modules not illustrated in FIGS. 1-11.

The computer 24 can be operated as a stand-alone device. The computer 24 has at least one coupling connection that acts as an expansion connector for providing an interface to a peripheral (e.g., handle 20), as described in detail below. In FIG. 1, the computer 24 is docked into the handle 20, through the coupling connection of the computer 24. The coupling connection of the computer 24 includes, for example, an electrical coupling for electrically coupling to the peripheral and a mechanical coupling for releaseably coupling to the peripheral. The peripheral is assigned "resistive values" which are identified by the computer 24 via the expansion connector when connected to the computer 24. Software resident in the computer 24 detects the handle 20 and its embedded peripheral.

The handle 20 has at least one coupling connection for electrically and mechanically coupling to another device, such as computer 24 or another peripheral. The coupling connections of the computer 24 and the handle 20 act as a carrier for add-on features (e.g., data collection/target identification modules including RFID readers/writers, scanners, and imagers, GPS modules, WWAN radio etc). This keeps the design of the handheld terminal 10 simple.

In addition, the mechanical design of the computer 24 and the handle 20 allows optimized target viewing, for example, at a range of approximately 12 to 14 inches. The angle between the viewing area of the display 30 and a scanner beam from the scanner/radio communications module 34 is optimized to provide the user with line-of-sight of the beam target while also viewing the display screen without manually tilting the device to view. This eliminates the need to constantly adjust the angle of the computer 24 (i.e., manually tilting it towards the user) to check whether a scan has been registered. This would also reduce user fatigue and forestall potential employee's loss work time due to claims of carpal tunnel syndrome (CTS). For example, the handle 20 may be used to activate the scan beam, which exits the portable terminal 10 at a certain angle (e.g., 15-20 degrees) to allow the barcode (beam target) to be scanned while also allowing the scan acknowledge to be visible on the display 30 without the need to "title" the portable terminal 10 towards the user to view the screen.

Figure 2:
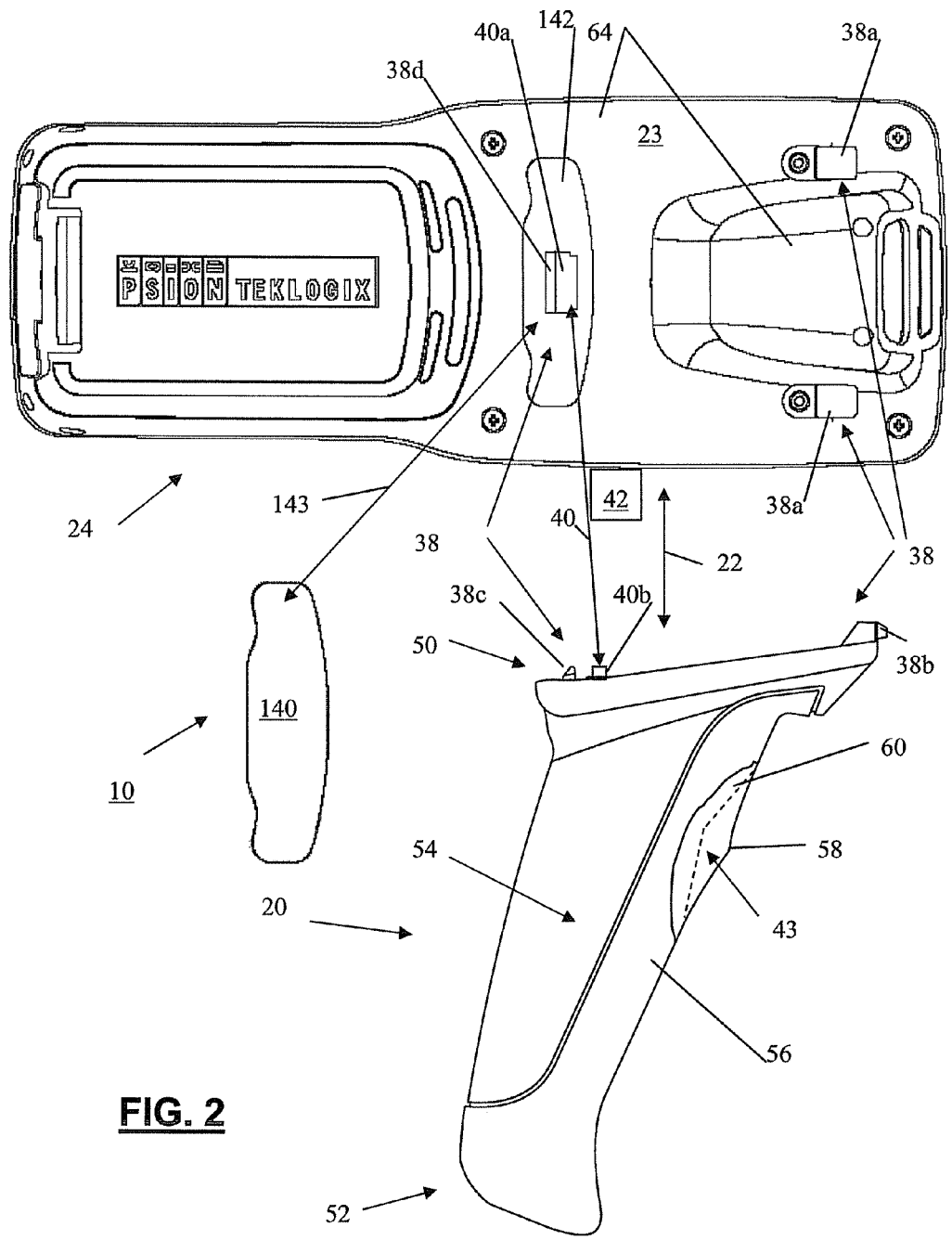
FIG. 2 is a back view of the handheld computer and a side view of the pistol grip of FIG. 1.
Figure 3:
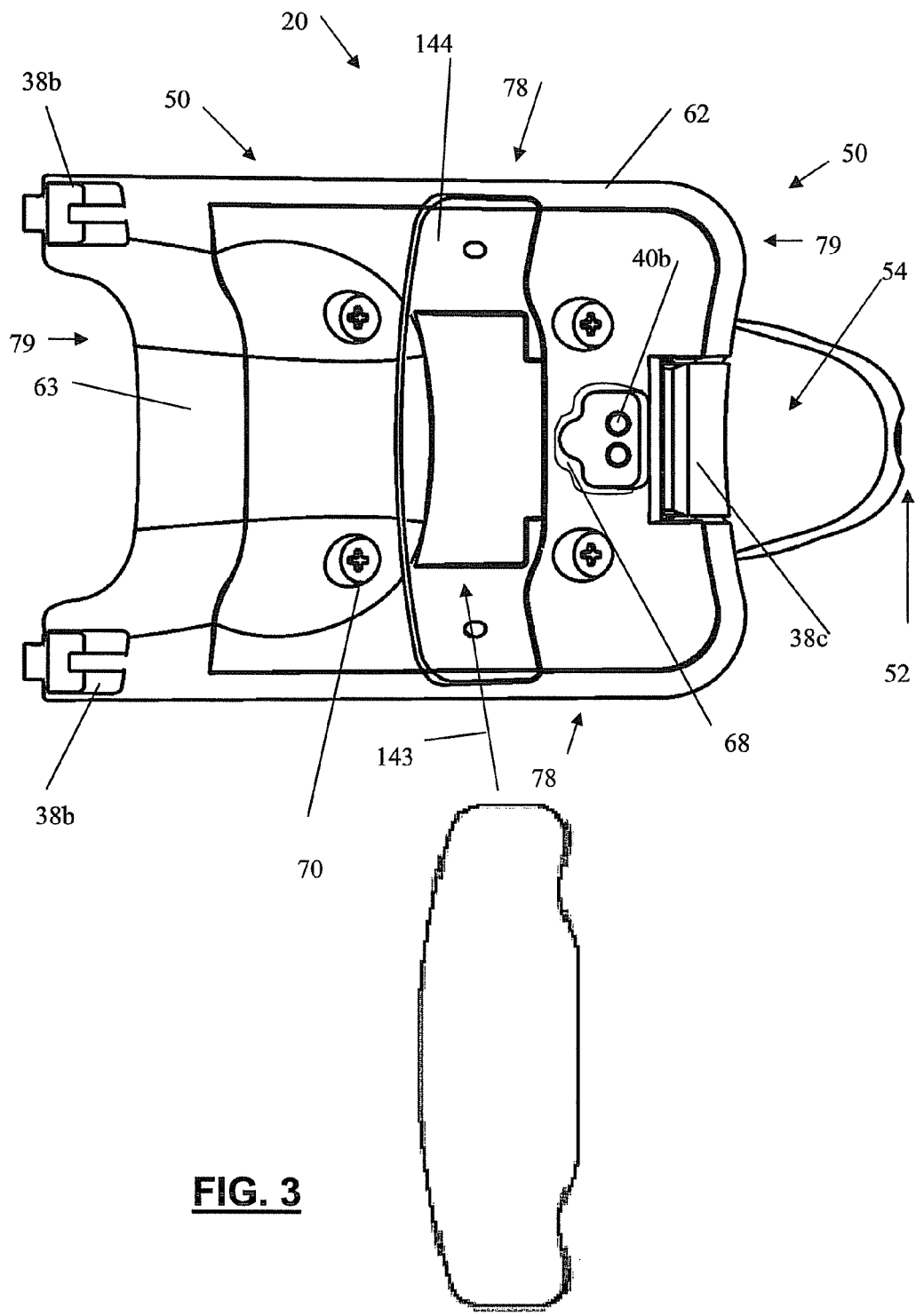
FIG. 3 is a front view of a proximal portion of the pistol grip of FIG. 1.

Referring to FIGS. 2-3, the handle 20 is shaped for grasping by a hand (not shown) of a user of the portable terminal 10, a body 21 of the handle 20 having a proximal end 50 for coupling to a device (e.g., computer 24), a distal end 52, and a grip portion 54 between the ends 50, 52 for grasping by the hand of the user. In this example, the enclosure 23 of the computer 24 is coupled to the proximal end 50.

The handle 20 is a pistol grip sled. In the disclosure, the terms "handle", "pistol grip", "pistol grip sled" are used interchangeably.

The grip portion 54 can optionally have an overmold portion 56, preferably made of a resiliently flexible material (e.g. rubber or other suitable polymers), for enhancing the grip of the user's hand on the body 21 of the handle 20. The overmold portion 56 can be referred to as an additional layer formed around the first part (e.g. body 21) that can be a previously molded part that is reinserted into a secondary mold for forming the additional layer on the previously molded part. For example, after injection and forming of the first molded part, i.e. the body 21, the component is rotated on a core from the one mold cavity to another. The second mold cavity is different from the first mold cavity in that the detail for the second molded part is included and used to add the overmold potion 56. The material (e.g. rubberized polymer) for the second molded part (i.e. the overmold 56) is then injected into the second mold cavity detail before the completed part (i.e. handle 20 and overmold portion 56) is ejected from the second mold. One example embodiment of the handle 20 is where the body 21 is made of a hard/rigid plastic material (e.g. thermoplastic polymer) while the overmold 56 is made of a softer, resilient material (e.g. thermoplastic elastomer (TPE) materials) that is adhered to the material/substrate (e.g. polypropene (PP), acrylonitrile-butadiene-styrene (ABS), polycarbonate (PC), Nylon etc.) of the body 21, thus facilitating a combined comfortable, non-slip, and abrasion-resistant grip portion 54 of the handle 20. Other fabrication methods can be used to assemble the overmold 56 to the body 21 of the handle 20, as known to a person skilled in the art. The proximal end 50 can be attached to the grip portion 54 of the body 21 via a plurality of fasteners 70 (e.g. screws), see FIG. 3, which can be configured to releasably secure the proximal end 50 to the grip portion 54, as desired.

The handle 20 also has an actuator assembly 43 (shown in dotted lines underneath the overmold portion 56). The actuator assembly 43 can have a raised portion 58, for facilitating user identification of the actuator assembly 43 underneath the overmold 56. Alternatively, or in addition, the overmold 56 can have an indicator section 60 for indicating to the user the location of the actuator assembly 43 on the grip portion 54 underneath the overmold 56. The indicator section 60, can have a material texture, colour, and/or shading different from other material of the overmold 56.

The proximal portion 50 of the handle 20 has a first surface 62 configured for mating with a second surface 64 of the enclosure 23 of the computer 24, such that a depression portion 63 of the first surface 62 can be configured to accommodate the shape of the enclosure 23 surrounding the communications module 34 (see FIG. 1). Maintaining the mating of the first surface 62 with the second surface 64 is facilitated by the connection 22, as further described below.

Connection (22) Configuration

Referring to FIG. 2, the handle 20 is shaped for grasping by a hand (not shown) of a user of the portable terminal 10. The handle 20 is coupled to the computer 24 via the connection 22, which includes both a mechanical coupling 38 for retaining the handle 20 as physically attached to the enclosure 23 (e.g. frame) and a control coupling 40 for facilitating communication (e.g. instruction/control signals 42) between the actuator assembly 43 (e.g. trigger) of the handle 20 and one or more components 19 of the computer 24. For example, the main logic board or the onboard processors 32 of the computer 24 are operably coupled to the handle 20 via the control coupling 40, and the components 19 of the computer 24 may be operated based on instructions/commands received via the control coupling 40.

Control Coupling (40)

Further, for example, the control coupling 40 can be configured to include an electrical contact 40a (e.g. (expansion) printed circuit board (PCB) connectors such as electrically conductive pads) coupled to one or more components 19 of the computer 24 and a mating electrical contact 40b (e.g. pogo pins) coupled to the actuator assembly 43, as further described below.

The electrical contact 40b is configured to establish a temporary operative electrical connection between the actuator assembly 43 and one or more components 19 of the computer 24 via the electrical contact 40a. For example, the pogo pin can take the form of a slender cylinder containing two spring-loaded pins, such that when pressed between two electronic circuits (e.g. of the computer 24 via the electrical contact 40a and the actuator assembly 43), points at each end of the pogo pin make secure electrical contacts with the two electronic circuits and thereby connect them together. The actuator assembly 43 is configured for affecting the operation of one or more of the components 19 of the computer 24 via the instruction/control signals 42 generated through physical interaction (e.g. depressing of the trigger) of user with the actuator assembly 43. Further, an optional seal 68 (e.g. made of resilient material such as but not limited to rubber and other resilient polymers) can be positioned around a periphery of the contact(s) 40a, 40b (e.g. see FIG. 3) as part of the control coupling 40, in order to inhibit the ingress of water or other foreign matter between the contacts 40a,b when the handle 20 is coupled to the enclosure 23 via the mechanical coupling 38.

Mechanical Coupling (38)

For example, the mechanical coupling 38 can be configured to include one or more slots 38a and mating protrusions 38b (with lip 45) and one or more latches 38c (with lip 45) and corresponding slots 38d on opposing sides 79 of the proximal portion 50, as further described below. The slots 38a can be located on the enclosure 23 and the protrusions 38b located on the handle 20 as shown, the slots 38a can be located on the handle 20 and the protrusions 38b located on the enclosure 23 (not shown), or a combination thereof. Further, the latch(s) 38c can be located on the handle 20 and the corresponding slot(s) 38d on the enclosure 23 (as shown), the latch(s) 38c can be located on the enclosure 23 and the corresponding slot(s) 38d on the handle 20 (not shown), or a combination thereof.

Referring to FIGS. 4-6b, the mechanical coupling 38 is configured so as to facilitate attachment of the optional handle 20 to the enclosure 23 without the aid of additional tools and corresponding fasteners (e.g. screwdrivers and screws, etc.). Further, the mechanical coupling 38 is configured so as to be compatible with a specified drop rating of the portable terminal 10, while facilitating the retention of the handle 20 to the enclosure 23, once attached, until subsequently released by the user through operation of the latch(s) 38c. In order to attach the handle 20 to the enclosure 23, the protrusions 38b can be engaged/inserted 70 into the slots 38a (resulting in contact of the lips 45 with an interior surface 25 (e.g. of the enclosure 23) that is adjacent to the slots 38b), and then the handle 20 can be pivoted 72 about the engaged slots and protrusions 38a and 38b towards the enclosure 23 so as to engage the latch(es) 38c with the corresponding slot 38d (resulting in contact of the lip 45 with the interior surface 25 that is adjacent to the slot 38d).

Once engaged, the first external surface 62 of the proximal portion 62 is located adjacent to the second external surface 64 of the enclosure 23 (see FIGS. 2 and 3). The engagement of the latch(es) 38c with the slot(s) 38d also causes the mating of the electrical contacts 40a,b in order to provide or otherwise enable the control coupling 40.

Figure 6A:
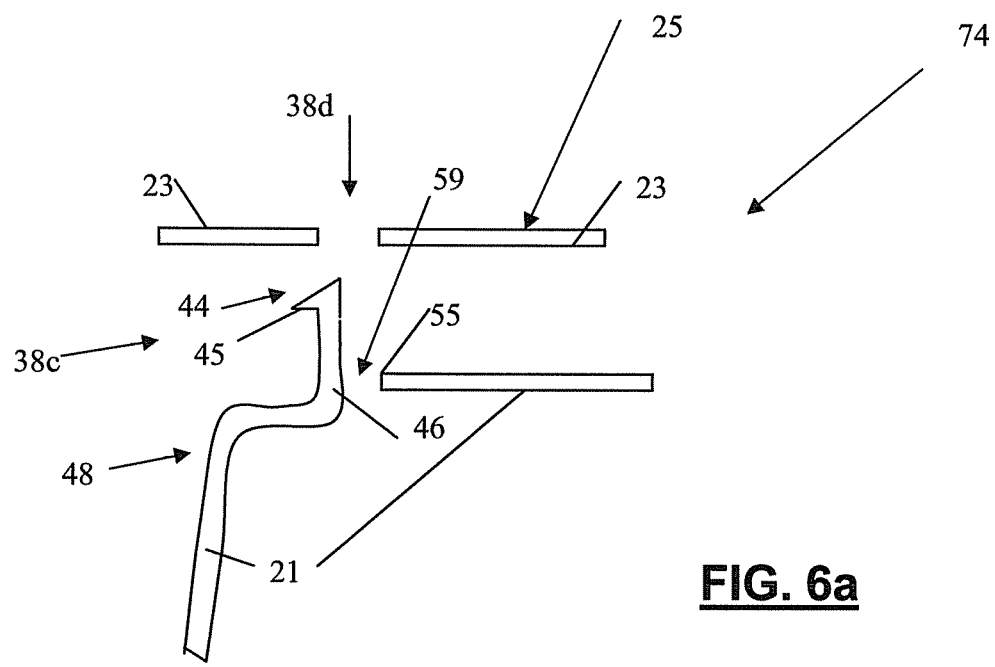
FIG. 6a is a view illustrating a mechanical coupling of the portable terminal the pistol grip of FIG. 1.
Figure 6B:
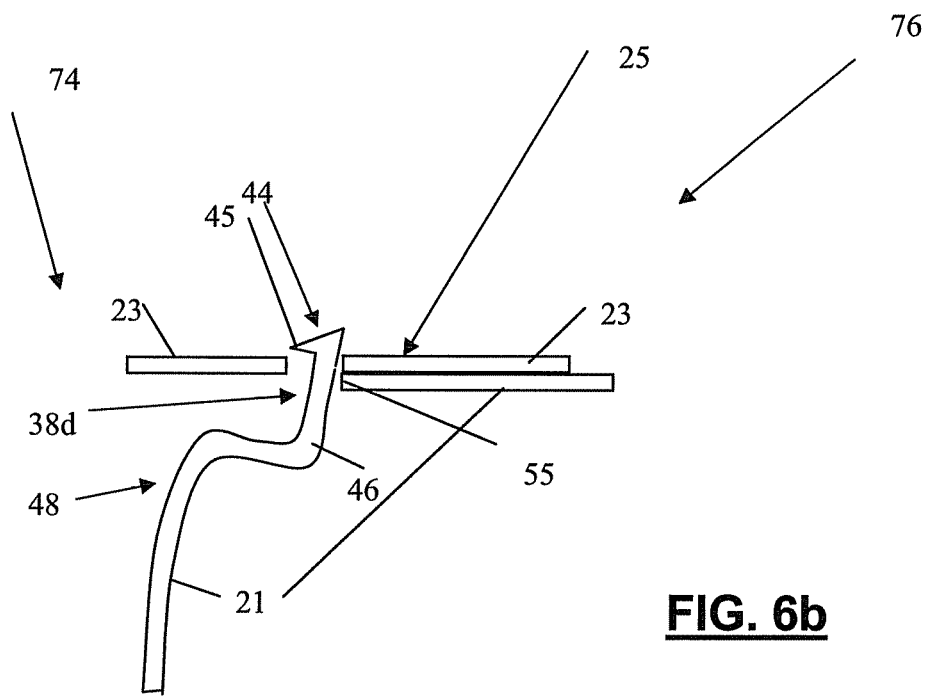
FIG. 6b is another view illustrating the mechanical coupling of the portable terminal and the pistol grip of FIG. 1.
Figure 7:
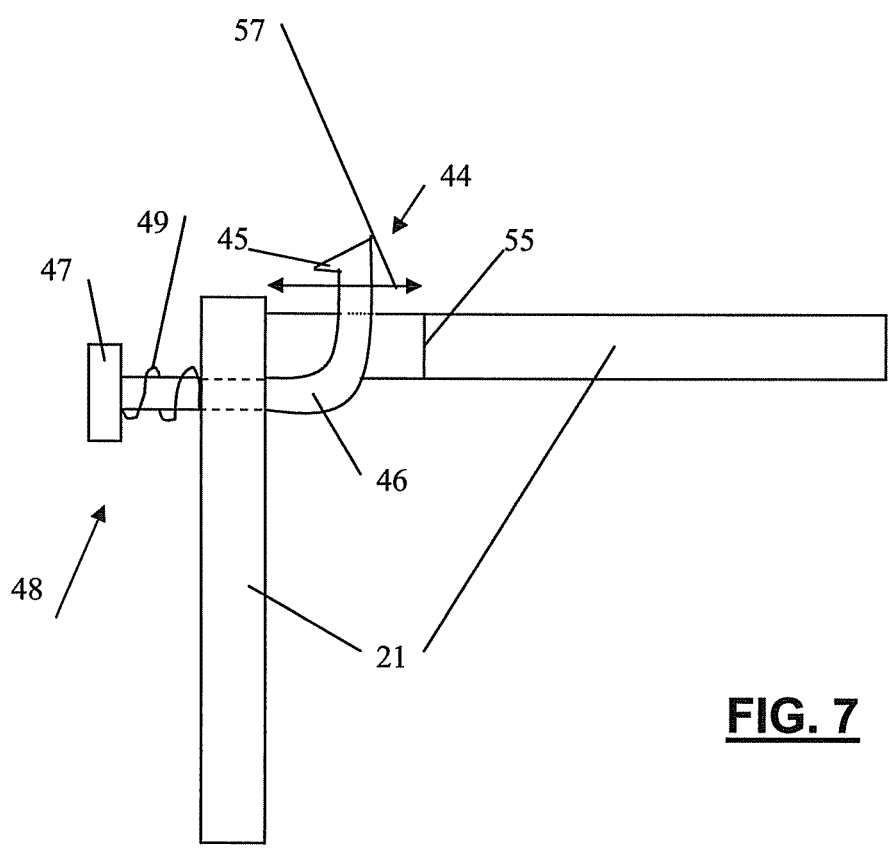
FIG. 7 is a side view of a protrusion that is coupled to the pistol grip.
Figure 8:
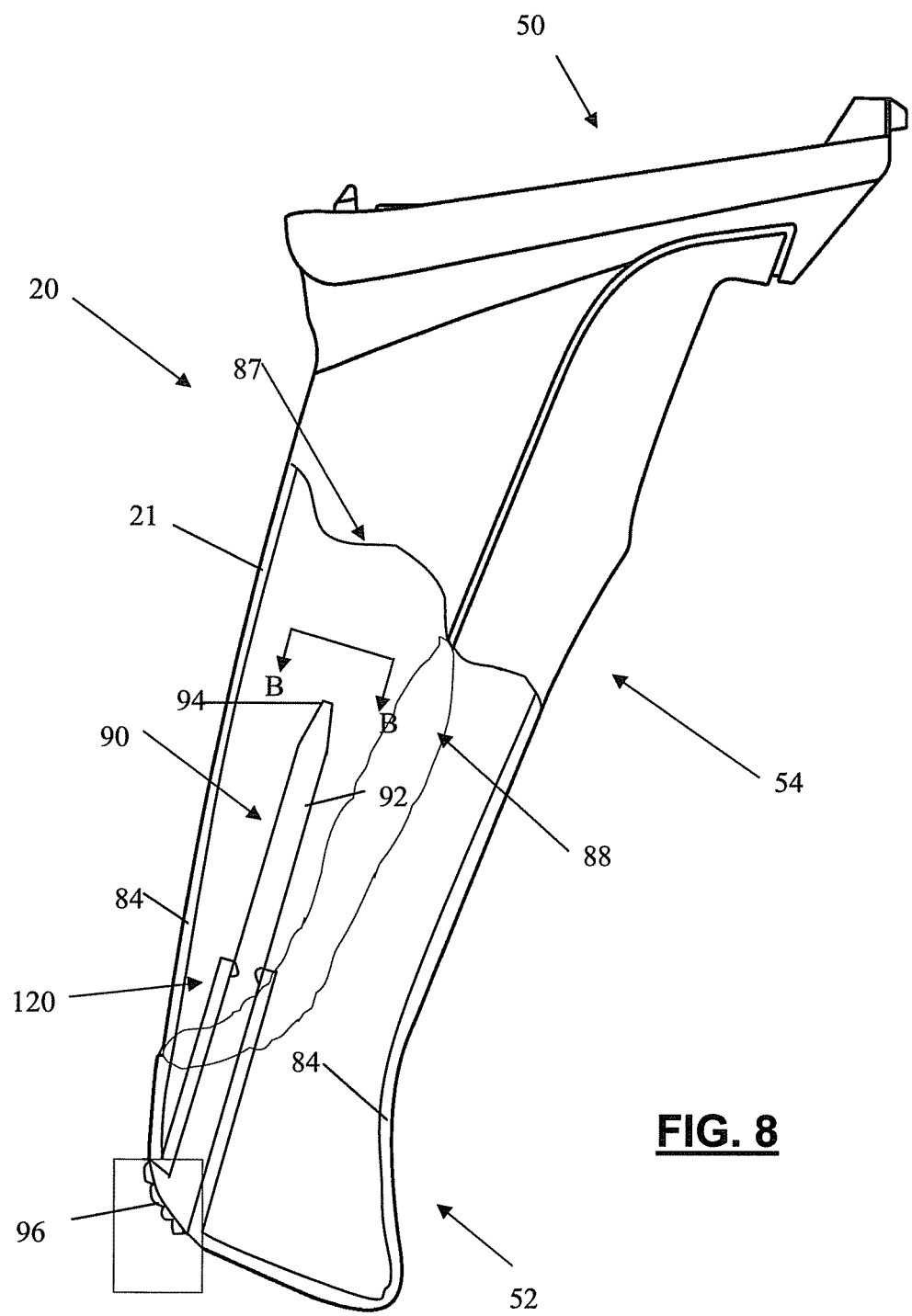
FIG. 8 is a further view of the pistol grip of FIG. 1.

Referring to FIGS. 5a, 5b, 6a, and 6b, the latch 38c has a protrusion 44 (that projects transversely from the surface 62—see FIG. 3) with a lip 45 configured for engaging 72 (see FIG. 4) with the slot 38d (FIG. 2). The protrusion 44 is coupled to the body 21 of the handle 20 by an arm 46 that has a resilient connection 48 to the body 21. For example, the resilient connection 48 can be configured as integrally connected with the material of the body 21 with a slit 80 between the body 21 and the arm 46 on either side of the arm 46. Another example of the resilient connection 48 is a button 47 on the arm 46 and spring 49 interposed between the button 47 and the arm 46 (FIG. 7). The positioning of an abutment surface 55, further described below, restricts travel 57 of the arm 46 (in a gap 59 between the arm 46 and the body 21)

during engagement 72 of the latch 38c with the corresponding slot 38d. Other resilient connection 48 configurations can be used for the latch 38c, as apparent to one skilled in the art.

The resilient connection 48 is used to bias the latch 46 towards a first position 74 (see FIG. 6a by example) as compared to a second position 76 (see FIG. 6b by example), whereby positioning of the latch 38a towards the abutment surface 55 in the second position 76 facilitates engagement 72 of the protrusion 44 with the slot 38d while positioning of the latch 38a away from the abutment surface 55 of the first position 74 facilitates the retention of the protrusion 44 in the slot 38d via the interaction between the lip 45 and the inside surface 25 of the slot 38d, once engaged 72 and until removed 72. For example, FIG. 6a shows the position of the latch 38c in the first position 74 and external/unengaged with the slot 38d, while FIG. 6b shows the position of the latch 38c in the second position 76 (towards the abutment surface 55) and internal/engaged with the slot 38d. Subsequent release of the latch 38c by the user results in displacement 57 of the latch 38c away from the abutment surface 55 and then contact occurs with the arm 46 with a side of the slot 38d, thus providing for a releasably secure engagement 72 of the handle 20 with the enclosure 23, until the latch 38c is subsequently displaced 57 towards the second position 74 and the protrusion 44 is removed 72 from the slot 38d to provide for detachment of the handle 20 from the enclosure 23.

Figure 4:
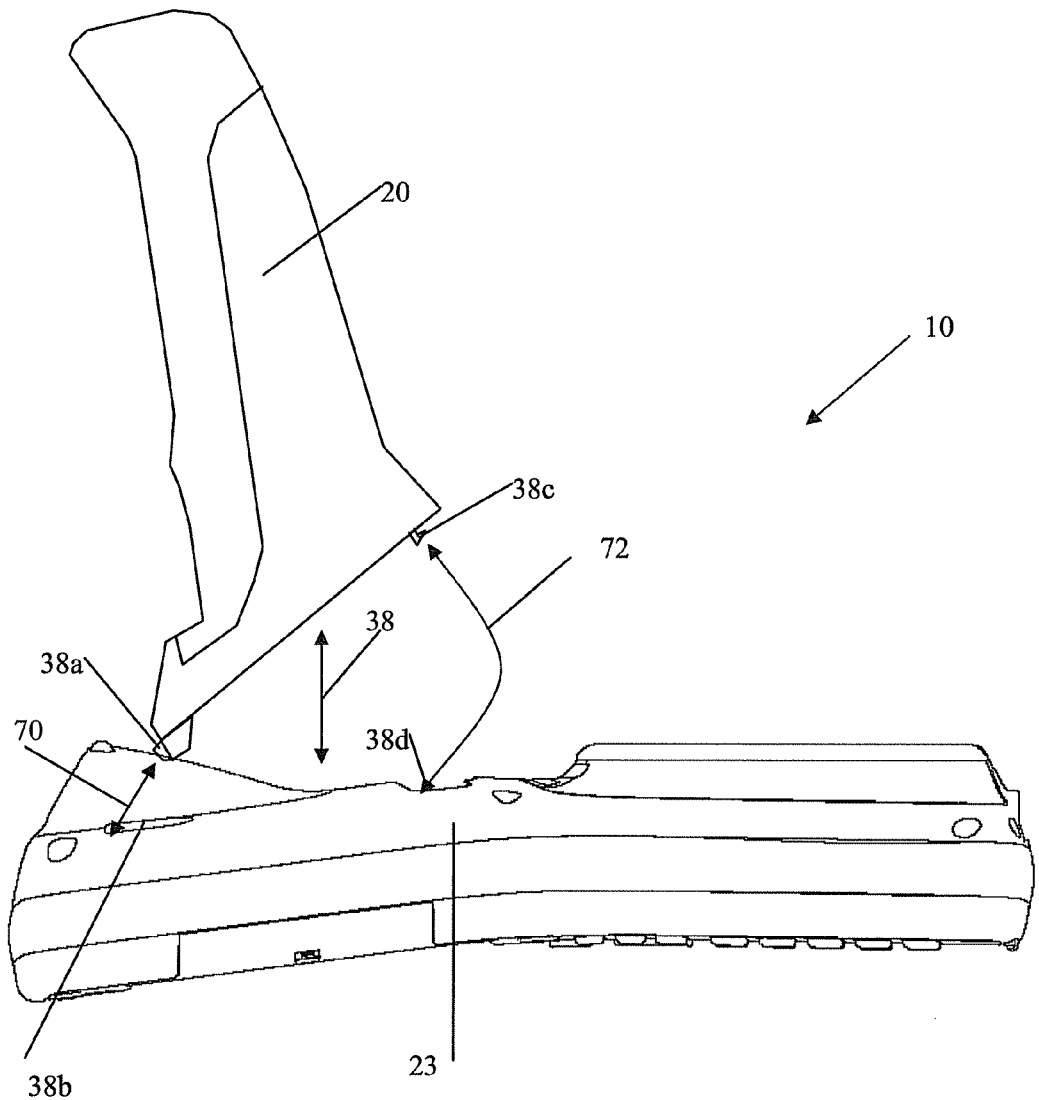
FIG. 4 is another side view of the portable terminal and the pistol grip of FIG. 1.
Figure 5A:
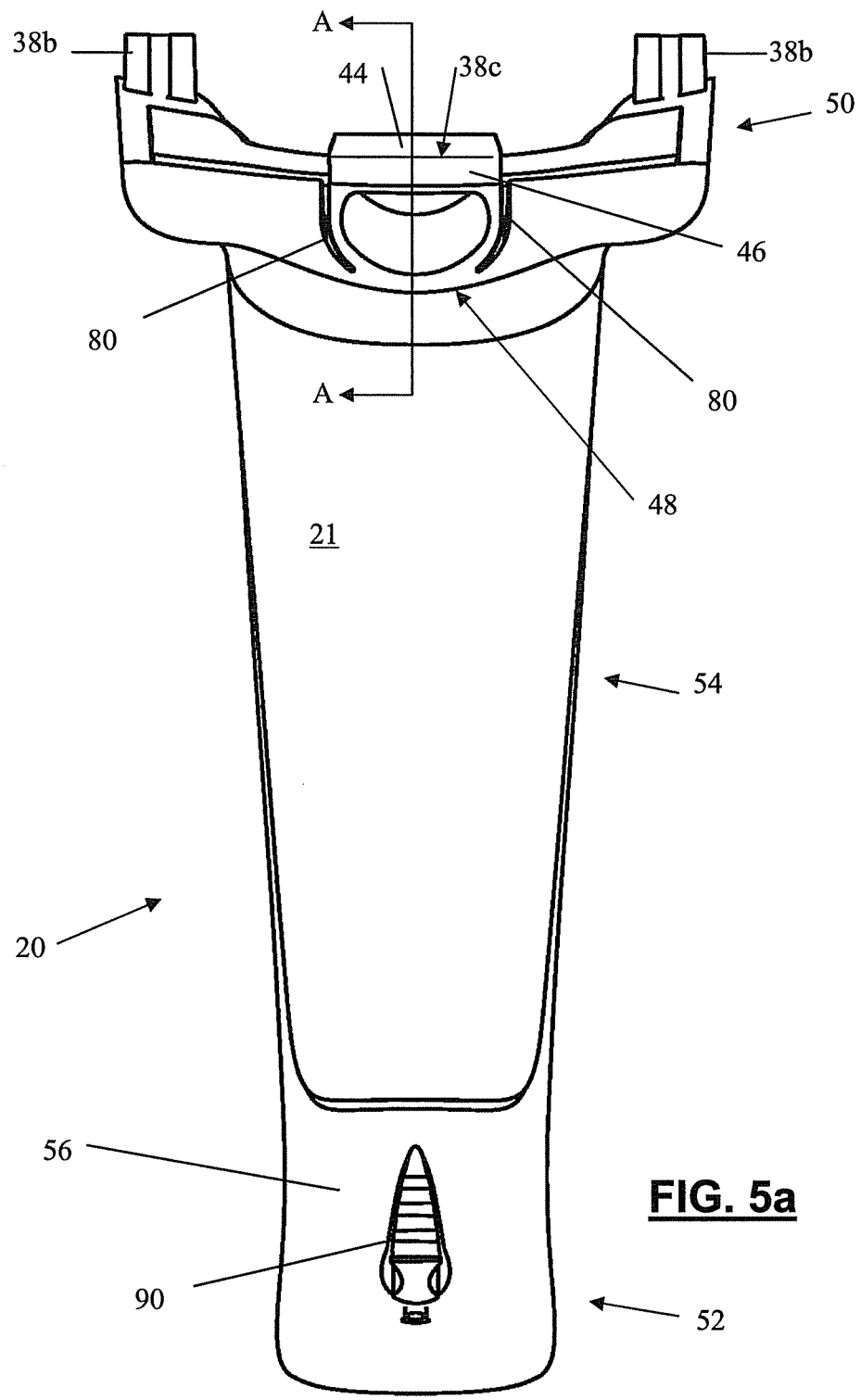
FIG. 5a is another view of the pistol grip of FIG. 1.
Figure 5B:
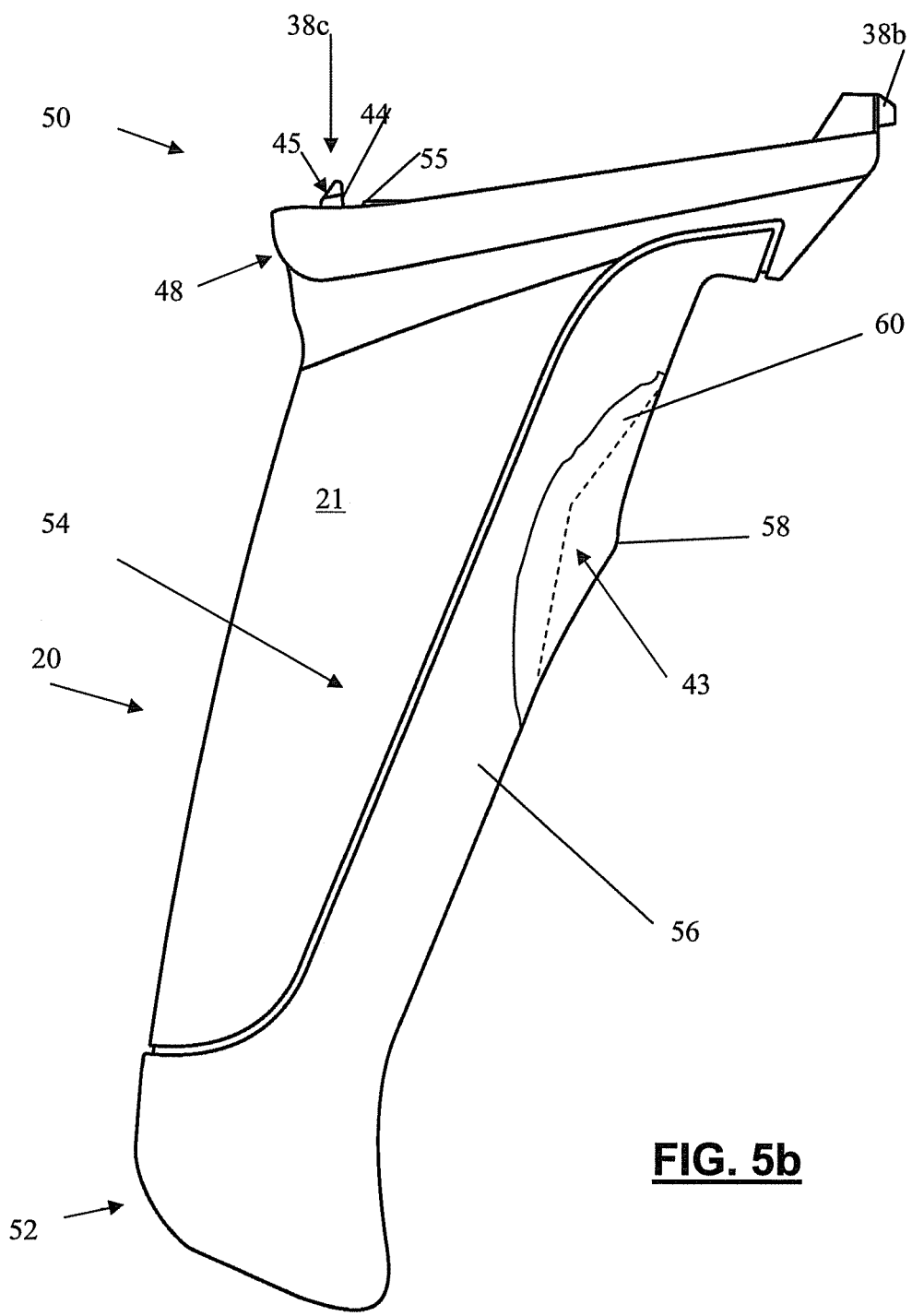
FIG. 5b is a further view of the pistol grip of FIG. 1.

In view of the above, the above example operation of the latch 38c with the slot 38d can be done before the protrusions 38b are inserted into the slots 38a (e.g. the engagement 72 is performed before the engagement 70—see FIG. 4) or as shown such that the engagement 70 is performed before the engagement 72. As well, the latch(es) 38c may be in the location of the protrusions 38b and the protrusion(s) 38b may be in the location of the latch(es) 38c, as desired. For example, the protrusions 38b are located on either side of the depression portion 63 of the proximal portion 50, so as to engage with the corresponding slots 38a on either side of a portion of the enclosure 23 housing the communications module 34. Further, the location of the latches 38c and/or the protrusions 38b could be located other than as shown (e.g. on sides 78—see FIG. 3) of the proximal portion 50 as compared to sides 79 of the proximal portion 50.

Actuator Assembly (43)

Figure 9:
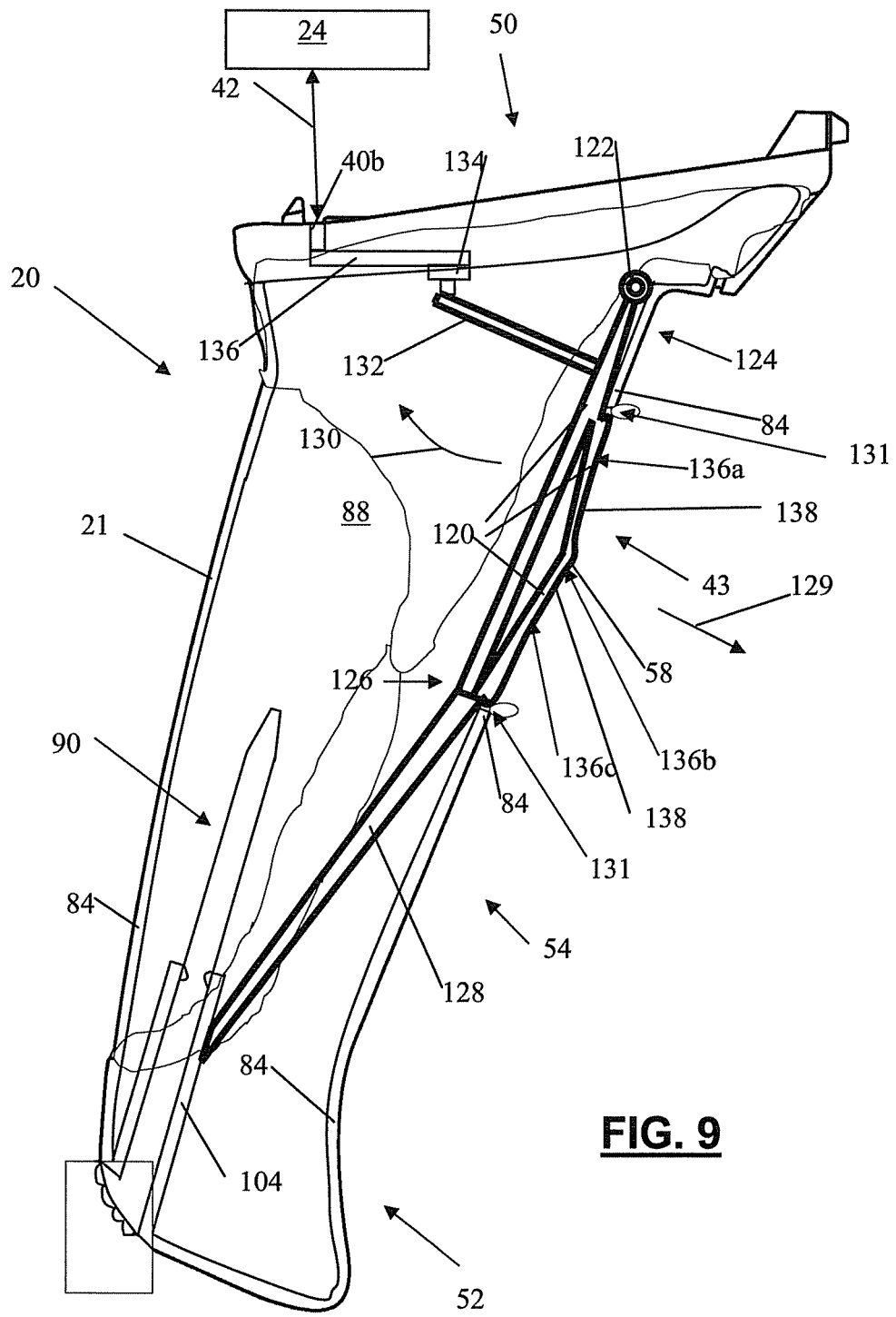
FIG. 9 is a further view of the pistol grip of FIG. 1.
Figure 10:
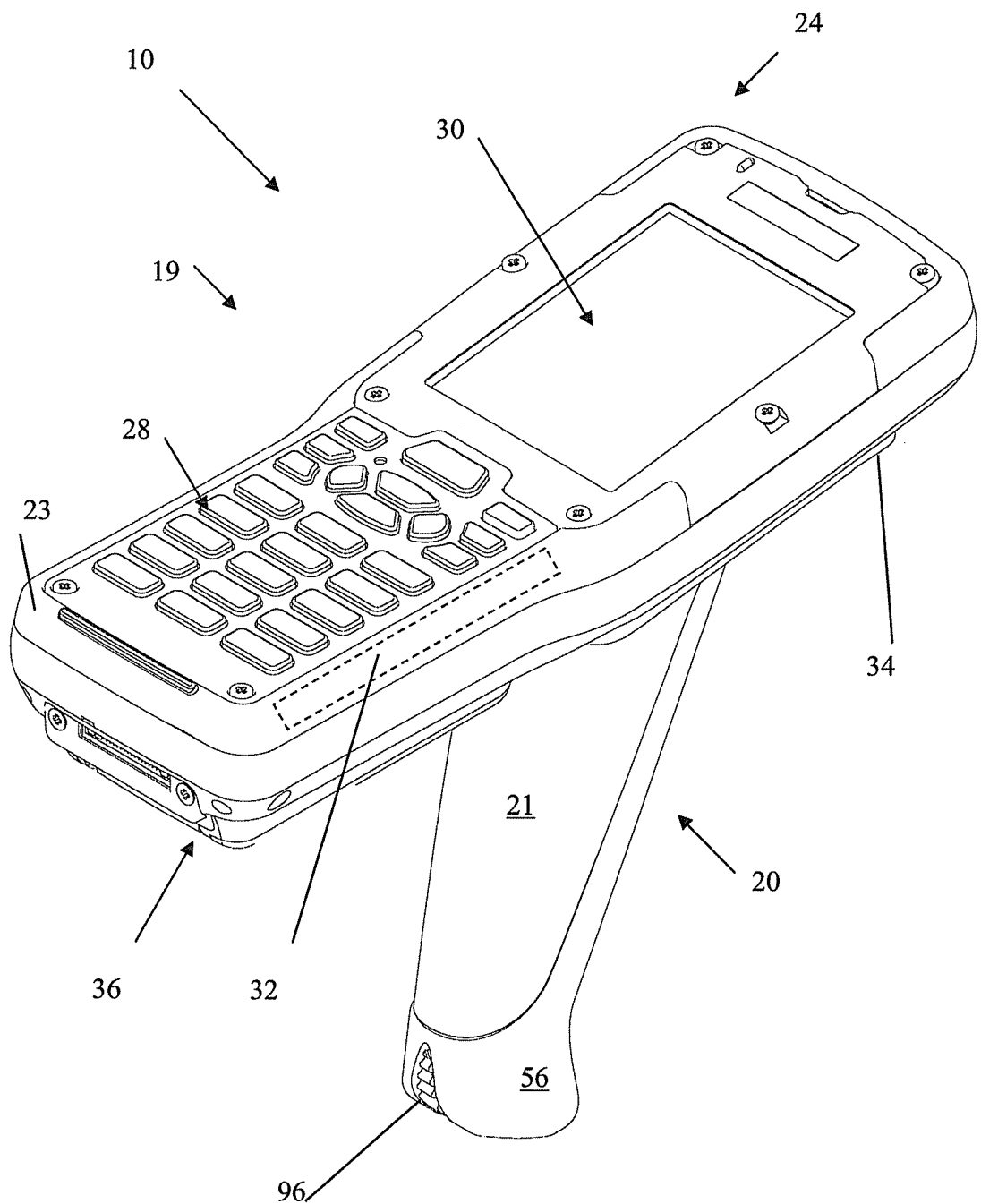
FIG. 10 is a perspective top view of the portable terminal with the pistol grip of FIG. 1.
Figure 11:
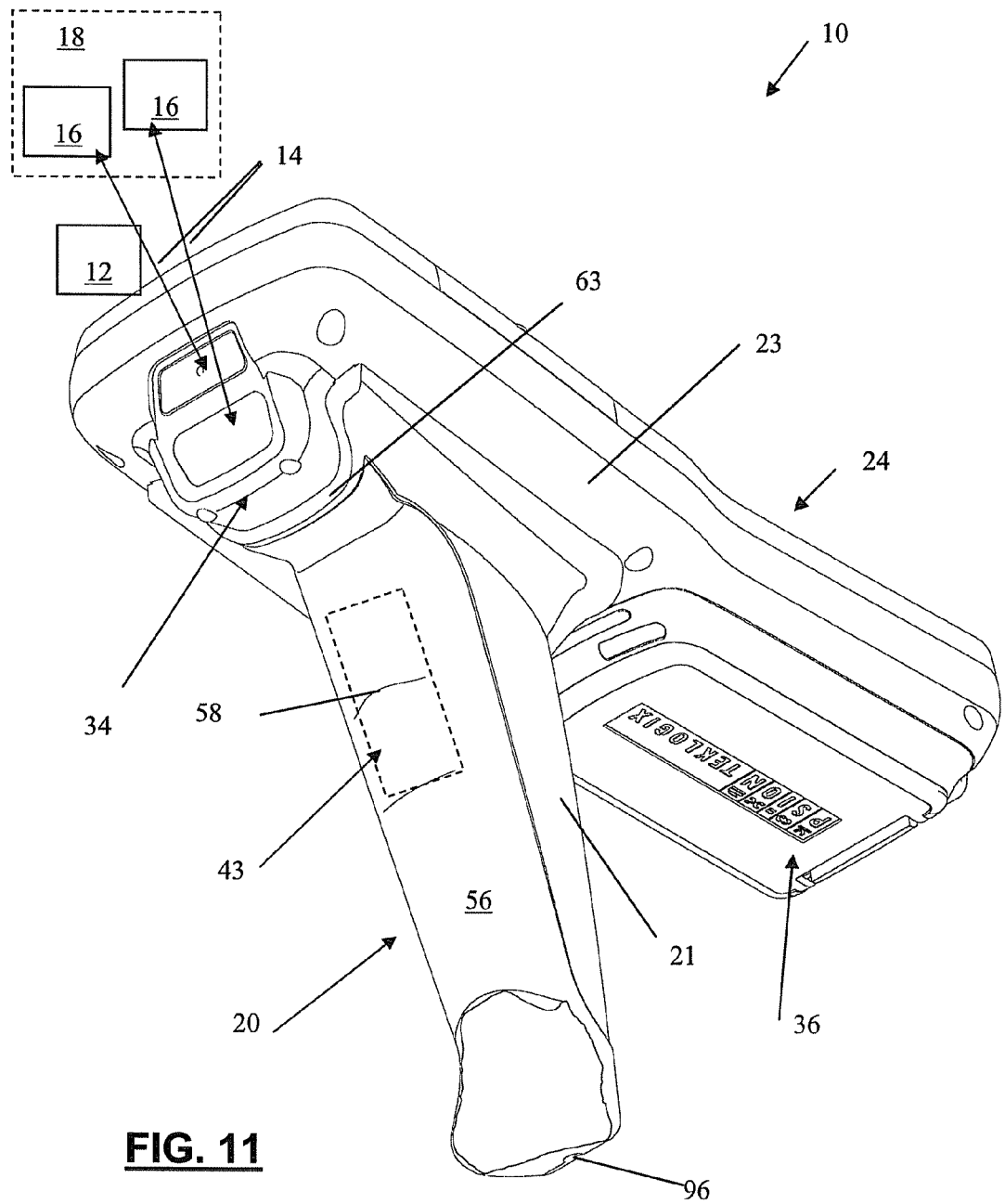
FIG. 11 is a perspective bottom view of the portable terminal with the pistol grip of FIG. 1.

Referring to FIGS. 2 and 9, the actuator assembly 43 is configured for affecting the operation of one or more of the components 19 of the computer 24 via the instruction/control signals 42 generated through physical interaction (e.g. depressing of the trigger) of the user with the actuator assembly 43. As is shown by example, the grip portion 54 has the overmold portion 56, preferably made of a resiliently flexible material, for enhancing the grip of the user's hand on the body 21 of the handle 20. The actuator assembly 43 (shown in dotted lines underneath the overmold portion 56) has a raised portion 58, for facilitating user identification of the actuator assembly 43 underneath the overmold 56. The raised portion 58 projects in a direction transverse or otherwise extending outwards from the surface of the grip region 54, and can be optionally covered by the overmold 56.

The overmold 56 can be used to cover a gap 131 around an actuator body 120 and the opening of the adjacent wall 84, in which the actuator body 120 is positioned, so as to inhibit foreign matter (e.g. water) penetration into the interior 88 of the body 21. The overmold 56 can only be adhered to the body 21 of the handle and not to the actuator body 120, thus providing for unhindered actuation/displacement of the actuator body 120 with respect to the handle body 21. Otherwise, in the case where the overmold 56 is also adhered to exterior surfaces 138 of the actuator body 120 and the handle body 21, the overmold 56 material is sufficiently resilient/elastic in nature to provide for corresponding actuation/displacement of the actuator body 120 with respect to the handle body 21, in order to result in sufficient switching of the switch 134 by a control arm 132.

Alternatively, or in addition, the overmold 56 can have an indicator section 60 for indicating to the user the location of the actuator assembly 43 on the grip portion 54 underneath the overmold 56. The indicator section 60, can have a material texture, colour, and/or shading different from other material of the overmold 56. Accordingly, the indicator section 60 can be use by the user to help identify the actuator assembly 43 region of the handle 20 from the remainder of the grip region 54, which can be beneficial in inhibiting accidental actuations of the actuator assembly 43. Inhibiting of accidental actuations can be desirable in view of conserving battery 36 life as well as reducing exposure of the environment 18 (see FIG. 1) to the wireless communications 14 (e.g. laser).

Referring to FIG. 9, shown is the example actuator assembly 43 with the overmold 56 and exterior shell of the body 21 removed to show the interior 88 of the handle 20. The actuator assembly 43 has the actuator body 120 connected to the body 21 at one end 124 by a pivot point 122 (e.g. hinge with an optional biasing member such as a coiled spring, etc.) and at another end 126 to a biasing member 128 (e.g. spring). The biasing member(s) are configured for biasing the actuator body 120 towards an unactivated/unactuated position 129 (e.g. the position at which the control signals 42 are not generated). The biasing member 128 is also connected to the body 21 (e.g. the arm 104). Depression of the actuator body 120 in a direction 130, about the pivot point 122, from the biased position 129 causes the control arm 132 (connected to the actuator body 120) to activate/depress the switch 134. Activation of the switch 134 generates the control signals 42, or otherwise causes a circuit 136 (optional) to generate the control signals 42. The control signals 42 are communicated via the electrical contact 40b to the computer 24, when coupled to the handle 20 (see FIG. 1). The switch 134 and the optional circuit 136 are also mounted on the body 21 of the handle 20.

The actuator body 120 has a plurality of trigger regions 136a, 136b, 136c for contact by the user's hand, in order to actuate the actuator mechanism 43. For example, the user can: put pressure on the actuator region 136c to cause the switch 134 to be depressed; put pressure on the actuator region 136b to cause the switch 134 to be depressed; and/or put pressure on the actuator region 136a to cause the switch 134 to be depressed, as described above. Once the actuator body 120 is released by the user's hand, the biasing member(s) (e.g. member 128 and/or 122) moves the actuator body 120 back towards the unactivated/unactuated position 129.

The actuator body 120 is shaped so as to provide for these different trigger regions 136a, 136b, 136c, either alone or in combination. For example, the trigger region 136a of the body 120 can start adjacent at one end (e.g. substantially flush with) to the wall 84 of the body 21 and then incline/rise to towards the raised portion/point 58 at the other end. The trigger region 136c of the body 120 can start adjacent at one end (e.g. substantially flush with) to the wall 84 of the body 21 and then incline/rise to towards the raised portion/point 58 at the other end. The trigger region 136b can be positioned at the raised portion/point 58. In this manner, the trigger portions 136a, 136c are connected to one another at the raised portion/point 58 and their outside surfaces 138 can be oriented at an obtuse angle (any angle more than 90° but less than 180°) as measured between the outside surfaces 138. The pivot point 122 can be positioned at the end 126 and the biasing member 128 at the other end 124, such that the switch 134 is configured to be activated when any of the trigger regions 136a, 136b, 136c are depressed.

In view of the above, manipulation of any of the trigger regions 136a, 136b, 136c, either alone or on combination, provides the same movement 130 of the actuator body 120 about the pivot point 122 and thus provides a same/similar tactile feel to the user each time the switch 134 is activated. Further, the ends of the trigger regions 136a, 136c can be as shown (e.g. flush with the adjacent wall 84 of the body 21), or can be raised (e.g. at a different height) with respect to the adjacent wall 84 of the body 21 to further denote the presence of the actuator body 120 under the overmold 56, as desired.

The handle 20 may have a holder (protrusion and groove) 104 onto which a stylus 90 for the computer 24 can be snapped.

Figure 12:
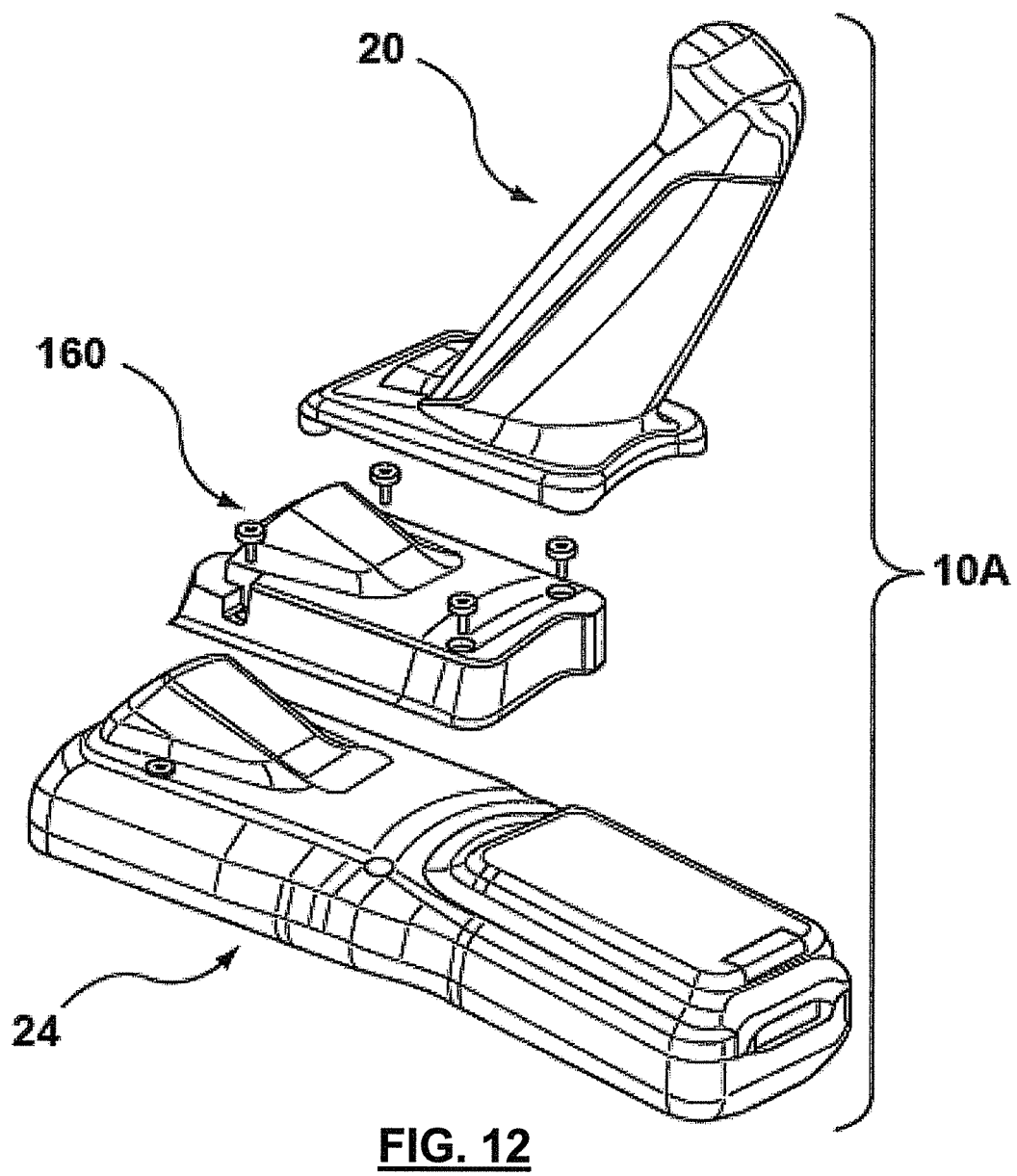
FIG. 12 is a side view of another example of the portable terminal of FIG. 1.

In the above example, the computer 24 is docked into the handle 20. However, another peripheral may be attached to the computer 24 or may be attached between the enclosure 23 of the computer 24 and the handle 20, as shown in FIG. 12. The attached peripheral may be operated from the computer 24, or the computer 24 may be operated by the peripheral.

In FIG. 12, the handheld computer 24 is coupling to an external peripheral 160, and the handle 20. The peripheral 160 is an external expansion and may have data acquisition components, communication components, memory etc. The computer 24 is coupled to the peripheral 160 via a control coupling that correspond to the control coupling 40 of FIG. 2, and also via a mechanical coupling that correspond to the mechanical coupling 38 of FIG. 2. The peripheral 160 is coupled to the handle 20 via a control coupling that corresponds to the control coupling 40 of FIG. 2, and also via a mechanical coupling that correspond to the mechanical coupling 38 of FIG. 2.

The computer 24 and the peripheral 160 communicate with each other when they are coupled to each other. The peripheral 160 and the handle 20 communicate with each other when they are coupled to each other. Thus the portable terminal 10A of FIG. 12 operates as a unit. Each of the handle 20 and the peripheral 160 is uniquely assigned "resistive values" which are detected upon connection to the computer 24. The peripheral 160 may include one or more functions, e.g., data collections, target identifications, image readers, pattern recognitions, communications modules, illumination modules, optical devices.

For example, the peripheral 160 has an electrical contact that corresponds to the mating electrical contact 40b and is coupled to the electrical contact 40a of the computer 24 (see FIG. 2). The peripheral 160 also has an electrical contact that corresponds to the electrical contact 40a and is coupled to the electrical contact 40b of the handle 20 (see FIG. 2).

The control coupling for the computer 24 and the peripheral 160 includes, for example, one or more slots, mating protrusions, one or more latches and slots that correspond to the slots 38, the mating protrusions 38b, the slots 38d (see FIG. 2). The control coupling for the peripheral 160 and the handle 20 includes, for example, one or more slots, mating protrusions, one or more latches and slots that correspond to the slots 38, the mating protrusions 38b, the slots 38d (see FIG. 2).

In the above example, the computer 24 having scan function is docked into the handle 20. However, other stand-alone devices, which may have modules other than scanners (e.g., target identifiers/data collection), may be docked on the handle 20 and be operably coupled to the handle 20 or operably coupled to the handle 20 via the peripheral 160.

According to the embodiments of the present invention, the mechanical design of the computer 24 and the handle 20 allows optimized target viewing at a range. This eliminates the need to constantly adjust the computer 24 (i.e., manually tilting it towards the operator) to check whether a scan had been registered. This improves productivity as a result of simultaneous scan and visual confirmation. This also reduces additional work of the user and forestalls potential employee loss work time due to claims of CTS.

According to the embodiments of the present invention, the handheld device can easily expand its functionalities without compromising the sealing integrity of the device or causing unnecessary loss-of-use due to the complexity of the typical upgrade process (i.e., return to authorized Service Depots for upgrade).

One or more currently preferred embodiments have been described by way of example. It will be apparent to persons skilled in the art that a number of variations and modifications can be made without departing from the scope of the invention as defined in the claims.

The invention claimed is:

1. A portable terminal, comprising:
    a handheld computer operable as a stand-alone device, including:
        operational components having:
        a display including a viewing area observable by a user,
        a keyboard including an input area operable by the user; and
        a device for capturing information from a target by pointing the device toward the target and acquiring an image of the target, the display and the device being operably coupled to a processor,
        an expansion connector coupled to the processor, the expansion connector operable to detachably couple to a peripheral including at least a handle to be held by the user,
        a non-folding housing mounting the operational components such that the viewing area of the display is arranged obliquely upward with respect to the input area of the keyboard, and the device mounted on the housing is pointed downward at an angle in the range from about 15 degrees to about 20 degrees with respect to the input area of the keyboard,
        the device being operable, when activated by the user holding the terminal, to acquire the image at a downward angle with respect to the viewing area of the display to allow the user to view the viewing area of the display while also having a line of sight to the target.

2. A portable terminal as claimed in claim 1, wherein the handheld computer uniquely identifies the peripheral via the expansion connector.

3. A portable terminal as claimed in claim 1, wherein the peripheral comprises:
    an actuator for operating at least one of the operational components.

4. A portable terminal as claimed in claim 3, wherein the actuator is configured so that the user operates the actuator with a user's hand holding the handle.

5. A portable terminal as claimed in claim 4, wherein the actuator comprises:
    a pressure sensitive trigger area for detecting a pressure and providing a tactile feedback, at least one of the operational components being operated by applying the pressure on the trigger area.

6. A portable terminal as claimed in claim 1, wherein the expansion connector can mechanically and operably couple to an external device and to the peripheral via an external device, the peripheral having an actuator assembly for operating the external device and the handheld computer.

7. The portable terminal as claimed in claim 1, wherein the device comprises:
 a scanner mounted on a housing of the terminal such that an axis of a beam emitted from the scanner is at the angle with respect to the input area of the keyboard.

* * * * *